(12) United States Patent
Kawaji

(10) Patent No.: US 10,579,486 B2
(45) Date of Patent: Mar. 3, 2020

(54) INTEGRATED PLATFORM, SERVER AND FAILOVER METHOD

(71) Applicant: HITACHI, LTD., Tokyo (JP)

(72) Inventor: Takuhiro Kawaji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 15/761,116

(22) PCT Filed: Jan. 8, 2016

(86) PCT No.: PCT/JP2016/050475
§ 371 (c)(1),
(2) Date: Mar. 19, 2018

(87) PCT Pub. No.: WO2017/119116
PCT Pub. Date: Jul. 13, 2017

(65) Prior Publication Data
US 2018/0260289 A1   Sep. 13, 2018

(51) Int. Cl.
*G06F 11/20* (2006.01)
*G06F 3/06* (2006.01)
*G06F 11/14* (2006.01)

(52) U.S. Cl.
CPC ........ *G06F 11/2023* (2013.01); *G06F 3/0617* (2013.01); *G06F 11/2033* (2013.01); *G06F 11/2038* (2013.01); *G06F 11/2046* (2013.01); *G06F 11/1484* (2013.01); *G06F 11/2097* (2013.01)

(58) Field of Classification Search
CPC combination set(s) only.
See application file for complete search history.

(56) References Cited

U.S. PATENT DOCUMENTS 5,280,627 A * 1/1994 Flaherty ............ H04L 29/06
709/222
6,343,324 B1 * 1/2002 Hubis ............... G06F 3/0622
709/229
(Continued)

FOREIGN PATENT DOCUMENTS

JP      4710518 B2   6/2011
JP    2014-041395 A  3/2014

OTHER PUBLICATIONS

International Search Report of PCT/JP2016/050475 dated Apr. 12, 2016.

*Primary Examiner* — Amine Riad
(74) *Attorney, Agent, or Firm* — Mattingly & Malur, PC

(57) ABSTRACT

Provided is an integrated platform that has an active server, a standby server and a storage device. The storage device has a plurality of storage ports, and a WWN is assigned to each of the plurality of storage ports. An LUID is assigned to each of a plurality of logical volumes provided by the storage device. The active and standby servers are connected, respectively, to storage ports in a one-to-one relationship. The active server has boot search information that associates the WWN of a storage port at a connection destination; the LUN of a boot logical volume, which is a logical volume accessed during booting; and the LUID of the boot logical volume with one another. When a failover is executed, the boot search information of the active server is copied to the standby server.

9 Claims, 12 Drawing Sheets

(56) References Cited

U.S. PATENT DOCUMENTS

| | | | |
|---|---|---|---|
| 6,931,519 B1* | 8/2005 | Keller | G06F 11/1417 713/1 |
| 7,340,638 B2* | 3/2008 | Nicholson | G06F 11/0709 714/2 |
| 7,353,259 B1* | 4/2008 | Bakke | G06F 9/44505 709/208 |
| 7,380,163 B2* | 5/2008 | Davies | G06F 11/1456 714/12 |
| 7,627,584 B2* | 12/2009 | Claborn | G06F 11/2028 707/782 |
| 7,657,778 B2 | 2/2010 | Goto et al. | |
| 7,721,138 B1* | 5/2010 | Lyadvinsky | G06F 11/1417 714/10 |
| 7,945,773 B2* | 5/2011 | Barabash | G06F 9/4405 713/100 |
| 8,006,125 B1* | 8/2011 | Meng | G06F 11/1417 714/6.2 |
| 8,352,778 B2* | 1/2013 | Takamoto | G06F 11/2028 714/15 |
| 8,601,314 B2* | 12/2013 | Hatasaki | G06F 11/2028 714/13 |
| 8,626,967 B1* | 1/2014 | Naik | G06F 13/14 710/31 |
| 8,705,344 B2* | 4/2014 | Hariharan | G06F 11/2007 370/217 |
| 8,812,903 B2* | 8/2014 | Goto | G06F 11/1076 714/6.23 |
| 9,747,180 B1* | 8/2017 | Fair | G06F 11/201 |
| 9,830,239 B2* | 11/2017 | Nazari | H04L 41/0668 |
| 2004/0153717 A1* | 8/2004 | Duncan | G06F 11/2069 714/6.23 |
| 2006/0130052 A1* | 6/2006 | Allen | G06F 8/63 717/172 |
| 2012/0218990 A1* | 8/2012 | Subramanyan | H04L 49/30 370/357 |
| 2013/0007504 A1* | 1/2013 | Bodke | G06F 11/1423 714/4.2 |
| 2014/0059302 A1 | 2/2014 | Hayakawa et al. | |

* cited by examiner

FIG. 5

Boot Order

| No | Description | DevicePath |
|----|-------------|------------|
| 1 | FC1 | Acpi(PNP0A08,0)/Pci(0x5,0x0)/Pci(0x0,0x0)/Fibre(WWN#A,0x0)/HD(1,MBR,0xA06A915F,0x800,0xAF000) |
| 2 | FC2 | Acpi(PNP0A08,0)/Pci(0x5,0x0)/Pci(0x0,0x0)/Fibre(WWN#B,0x0)/HD(1,MBR,0xA06A915F,0x800,0xAF000) |
| 3 | FC3 | Acpi(PNP0A08,0)/Pci(0x5,0x0)/Pci(0x0,0x0)/Fibre(WWN#C,0x0)/HD(1,MBR,0xA06A915F,0x800,0xAF000) |
| : | : | : |

Related Art

FIG. 6

Boot Order
1800

| No | Description | DevicePath |
|---|---|---|
| 1 | FC1 | Acpi(PNP0A08,0)/Pci(0x5,0x0)/Pci(0x0,0x0)/VenMsg(Vender GUID,LUID#C)/HD(1,MBR,0xA06A915F,0x800,0xAF000) |
| 2 | FC2 | Acpi(PNP0A08,0)/Pci(0x5,0x0)/Pci(0x0,0x0)/VenMsg(Vender GUID,LUID#B)/HD(1,MBR,0xA06A915F,0x800,0xAF000) |
| 3 | FC3 | Acpi(PNP0A08,0)/Pci(0x5,0x0)/Pci(0x0,0x0)/VenMsg(Vender GUID,LUID#A)/HD(1,MBR,0xA06A915F,0x800,0xAF000) |
| : | : | : |

FIG. 7

Boot Priority
1500A

| No | WWN | LUN | LUID |
|---|---|---|---|
| 1 | #1 | #z | #C |
| 2 | #2 | #y | #B |
| 3 | #3 | #x | #A |
| : | : | | : |

FIG. 8

Boot Priority
1500B

| No | WWN | LUN | LUID |
|---|---|---|---|
| 1 | #2 | #z | #C |
| 2 | #2 | #y | #B |
| 3 | #3 | #x | #A |
| : | : | | : |

INTEGRATED PLATFORM, SERVER AND FAILOVER METHOD

TECHNICAL FIELD

This invention generally relates to computer control, and more particularly, to computer redundancy.

BACKGROUND ART

In storage networks, it is desired to an access to an LU (Logical Unit) to be limited to a particular server. This is because a server may erroneously access an LU (for example, logical volume (logical VOL)) that is not allowed to be accessed (I/O (Input/Output)) and erroneously update data in the LU.

The LU masking function is known as technology for limiting an access to an LU to a particular server. The LU masking function creates, for each port included in a storage device, an access control list for the LU. The access control list includes a WWN (World Wide Name) of a physical port for an FC-HBA (Fibre Channel-Host Bus Adapter) that is allowed to access an LU in the storage device.

The number of I/O ports (referred to as "storage ports") in the storage device is conventionally as small as one to two ports, and an FC switch is used to enable accesses from a plurality of servers. In recent years, however, 10 or more storage ports are often mounted, and a storage device can now directly couple a plurality of servers without using an expensive FC switch.

CITATION LIST

Patent Literature

[PTL 1]
Japanese Patent No. 4710518
[PTL 2]
Japanese Patent Application Publication No. 2014-41395

SUMMARY OF INVENTION

Technical Problem

PTL 1 assumes that an FC-HBA and an FC (Fibre Channel) port in a storage device are coupled through an FC switch. Thus, owing to the function of the FC switch, before and after switching from an active server to a standby server, an I/O request issued from the active server before switching and an I/O request issued from the standby server after switching are received by the same storage port. An access control list for LUs is applied in units of storage ports (for example, access control list is allocated to storage port), but as described above, storage ports for receiving the I/O requests designating the same LU are the same before and after the switching from the active server to the standby server. Thus, the server before switching can access the same LU.

On the other hand, when a storage port and a physical port in a server are directly coupled via an FC cable or a PCIe (Peripheral Component Interconnect Express) bus (in other words, when the storage port and the physical port in the server correspond to each other in a one-to-one relationship), before and after switching from an active server to a standby server, an I/O request issued from the active server before switching and an I/O request issued from the standby server after switching are received by different storage ports. The standby server after switching transmits an LU search instruction on the basis of a WWN of a storage port to which the I/O request is transmitted. However, the WWN of a storage port that receives the I/O request has been changed, and hence the LU cannot be found. Thus, the standby server after switching cannot access the LU.

PTL 2 assumes the configuration of virtualized LPAR (Logical PARtition). Thus, an unvirtualized computer system cannot solve the above-mentioned problem.

It is therefore an object of this invention to boot a standby server normally when failover is executed.

Solution to Problem

An integrated platform according to one embodiment includes an active server and a standby server and a storage device.

The storage device has a plurality of storage ports, and each of the plurality of storage ports is assigned with a World Wide Name (WWN).

A plurality of logical volumes provided by the storage device are each assigned with a Logical Unit ID (LUID) that can be uniquely identified.

The active and standby servers are each coupled to a storage port in a one-to-one relationship.

The active server has boot search information that associates a WWN of a storage port at a connection destination, a Logical Unit Number (LUN) of a boot logical volume that is a logical volume accessed during booting, and an LUID of the boot logical volume with one another.

When failover is executed, the boot search information in the active server is copied to the standby server.

Advantageous Effects of Invention

According to this invention, when failover is executed, a standby server can boot normally.

BRIEF DESCRIPTION OF DRAWINGS

FIG. 5 illustrates a reference example of a Boot Order.
FIG. 6 illustrates an example of a Boot Order according to this embodiment.
FIG. 7 illustrates a configuration example of a Boot Priority.
FIG. 8 illustrates a configuration example of the Boot Priority.

DESCRIPTION OF EMBODIMENTS

Figure 1:
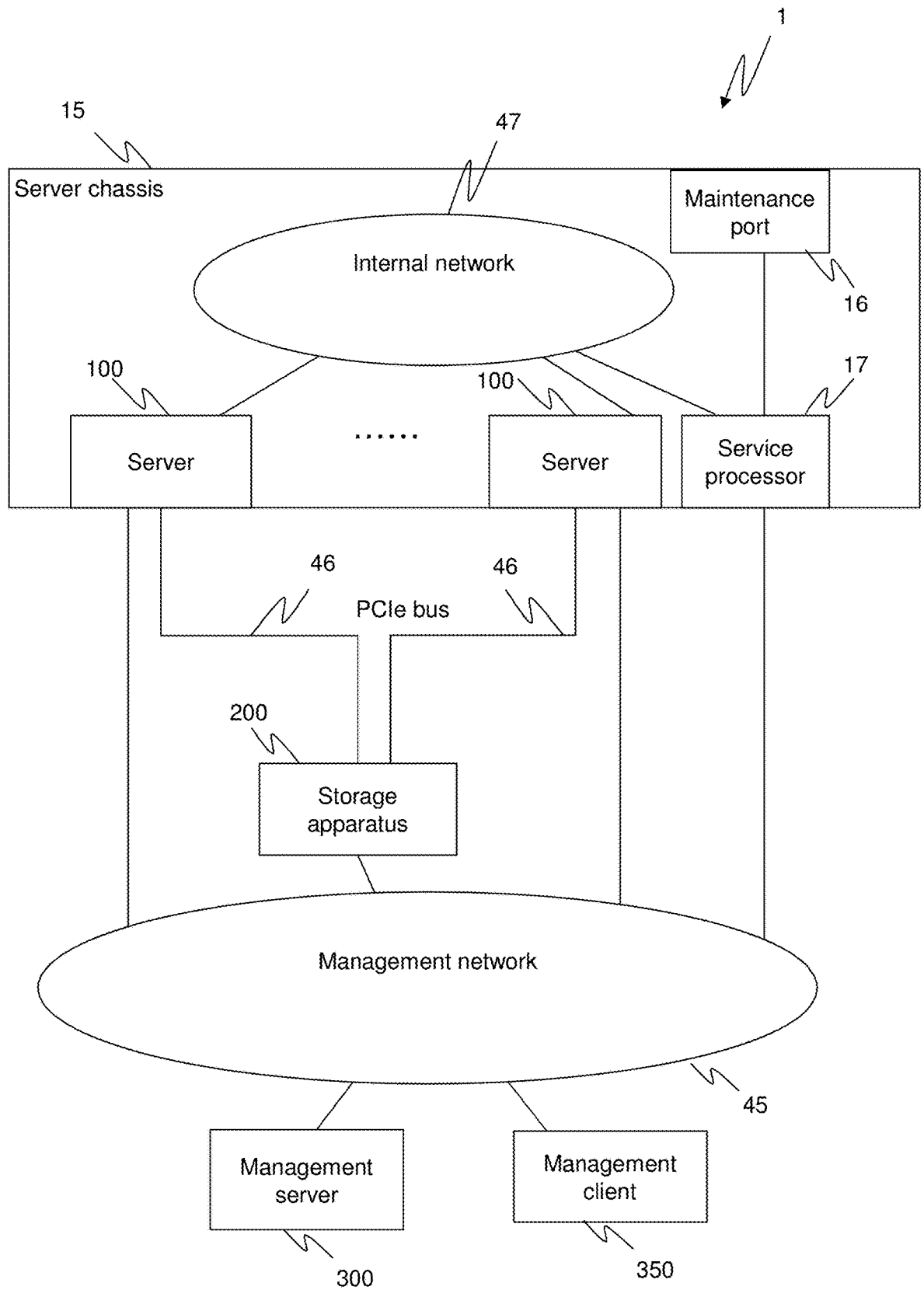
FIG. 1 illustrates a configuration example of an integrated platform.

Referring to the drawings, embodiments are described below. In the following description, information in the embodiments is described with expressions such as "aaa table" and "aaa list", but the information may be expressed by data structures other than the table and list. Thus, "aaa table" and "aaa list" can be referred to as "aaa information" in order to indicate that the information is independent from the data structure.

In the following description, at least one of "name" and "ID" is sometimes used as an example of identification information on elements in each information, but "name" and "ID" can be replaced with each other.

The following description can be implemented also under virtualized environments. In this case, "Boot Priority" can be replaced with "virtual Boot Priority" owned by a virtual FC-HBA on LPAR, and "Boot Order" can be replaced with "virtual Boot Order" owned by a guest EFI on the LPAR.

In the following description, the name and reference symbol are sometimes used to describe elements of the same type without discriminating each other (for example, server 100), and identification information allocated to elements of the same type are sometimes used to describe the elements while discriminating each other (for example, servers 100A and 100B).

In the following description, processing is sometimes described with a "program" as its subject. A program is executed by a processor to perform predetermined processing by using a memory and a communication port (communication control apparatus). Thus, the processing may be described as processing with the processor as its subject. Processing disclosed with a program as its subject may be processing performed by an apparatus (for example, management system or storage device) having a processor configured to execute the program. A part or whole of the program may be implemented by dedicated hardware. Various kinds of programs may be installed on each computer by a program distribution server or a storage medium.

Embodiment 1

FIG. 1 illustrates a configuration example of an integrated platform according to this embodiment.

An integrated platform 1 includes a storage device 200 and a plurality of servers 100. The storage device 200 and the plurality of servers 100 are coupled to each other via a PCIe bus 46 such that bidirectional communication is possible. The plurality of servers 100 are mounted in a server chassis 15. The storage device 200 and the plurality of servers 100 are coupled to each other via a management network 45 so as to be capable of communicating with a management server 300 such that bidirectional communication is possible. A management client 350 for the management server 300 and a service processor (SVP) 17 mounted in the server chassis 15 may be coupled to the management network 45. The management network 45 may be, for example, a communication network such as a LAN (Local Area Network).

When the server 100 receives an I/O request for files from a client computer (not shown), for example, the server 100 may access the storage device 200 on the basis of the received I/O request. Accessing the storage device 200 may involve transmitting an I/O request from the server 100 to the storage device 200. An internal network (for example, LAN) 47 may exist inside the server chassis 15.

An SVP 17 is an example of a controller, and manages each server 100 via the internal network 47. The SVP 17 may make a failover instruction to at least one of a server 100 at a switching source and a server 100 at a switching destination. The SVP 17 may be coupled to a maintenance port 16 inside the server chassis 15 via a circuit such as an internal bus such that bidirectional communication is possible. An administrator can directly couple a maintenance terminal to the maintenance port 16, and operate the SVP 17 not via the management network 45 by using the maintenance terminal.

The management server 300 is an example of a management system, and manages a computer system via the management network 45. The management server 300 may also make a failover instruction to at least one of a server 100 at a switching source and a server 100 at a switching destination. In other words, each server 100 may receive a failover instruction from at least one of the SVP 17 and the management server 30000. In this manner, in the server chassis 15, the SVP 17 can detect a predetermined event and automatically perform failover without being instructed by the management server 300, and may perform failover by being instructed by the management server 300 (for example, in response to manual operation by an operator (administrator) of the management client 350).

The management client 350 is a computer configured to communicate with a GUI display processing module 32300 (see FIG. 4) in the management server 300 via the management network 45 to display various kinds of information on a WEB browser. An administrator can manage apparatuses in the computer system by referring to the information displayed on the WEB browser on the management client. The management server 300 and the management client 350 may be configured by a single server.

Figure 2:
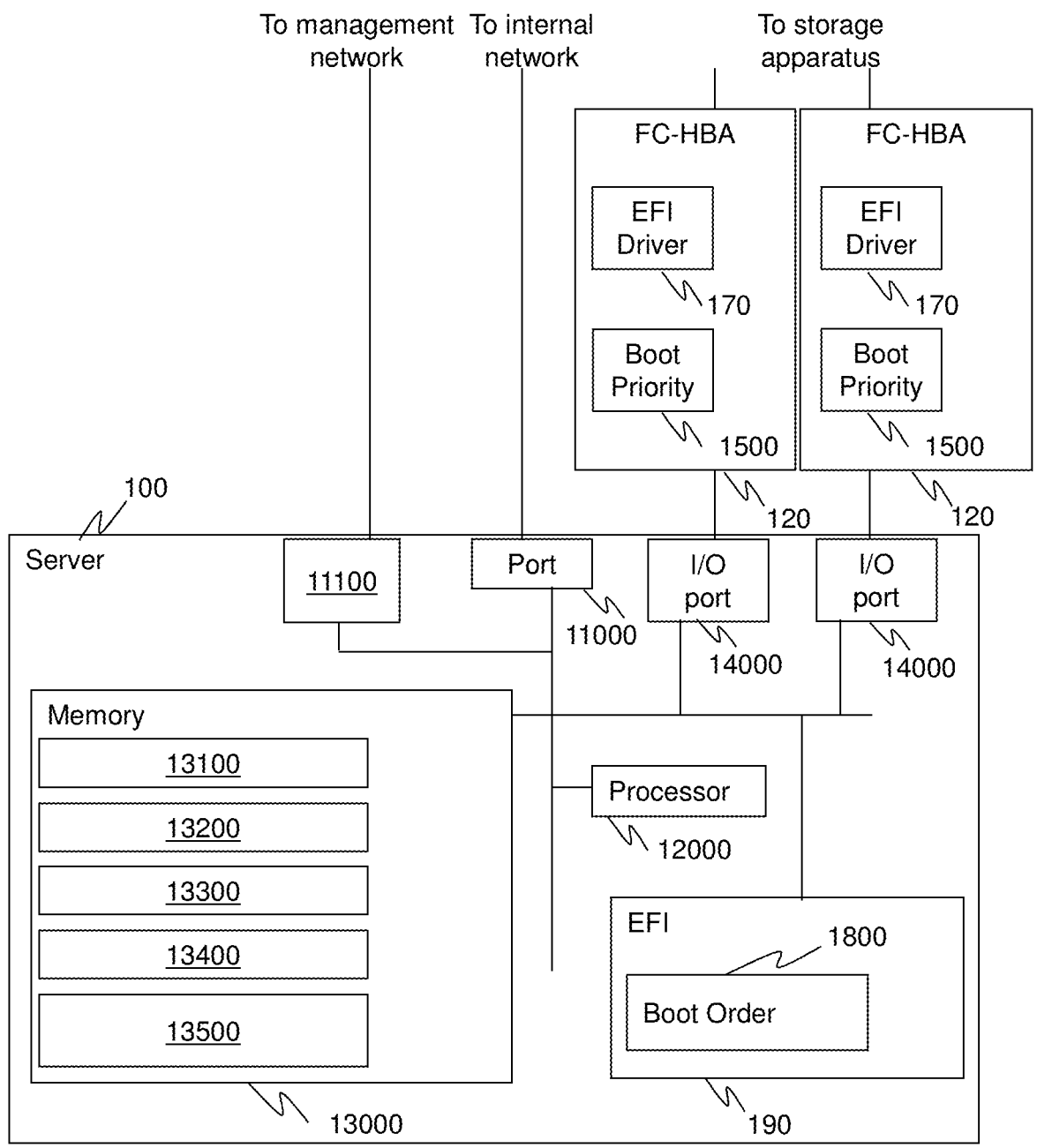
FIG. 2 illustrates a configuration example of a server.

FIG. 2 illustrates a configuration example of the server 100.

The server 100 includes a management port 11100 coupled to the management network 45, a port 11000 coupled to the internal network 47, one or more I/O ports 14000, an FC-HBA 120 coupled to the storage device 200 via a PCIe bus, a memory 13000, a processor 12000, and an EFI 190. These elements are coupled via a circuit such as an internal bus such that bidirectional communication is possible.

The processor 12000 may be configured by one or more processors. The memory 13000 may be configured by one or more memories, and may include a storage device such as an auxiliary storage device. The EFI 190 has a Boot Order 1800, and the Boot Order 180 is used to access a logical VOL in the storage device 200.

The server 100 accesses the storage device 200 via the FC-HBA 120. The FC-HBA 120 has a Boot Priority 1500 used for the server 100 to access a logical VOL. The FC-HBA 120 has an EFI driver 170 used to initialize the FC-HBA 120 and access the storage device 200.

In the memory 13000, an OS 13100, an LPAR management program 13200, an I/O port management table 13300, an LPAR management table 13400, and an LPAR operation schedule management table 13500 may be stored.

The LPAR management program 13200 creates an LPAR by logically dividing physical resources (computer resources) such as the processor 12000 and the memory 13000 provided by an operating system 13100. The LPAR can also be called "management computer". The LPAR created by the LPAR management program 13200 recognizes, as a storage area, a logical VOL on a storage device 200 coupled to the server 100 via the PCIe bus 46000.

In FIG. 2, the LPAR management program 13200 exists in the memory 13000. However, the LPAR management program is not necessarily required to exist, and a business application configured to use a storage area provided by the operating system 13100 and performs I/O on the storage area may exist instead. In other words, a server 100 that cannot construct (cannot execute) an LPAR may exist.

Although the LPAR management program 13200 exists in the memory 13000 in FIG. 2, a virtualization control program may exist instead of the LPAR management program, and a virtualization control program may abstract and standardize physical resources such as the processor 12000 and the memory 13000, thereby providing virtual hardware to a virtual machine. In this case, in the following description, the LPAR corresponds to a virtual machine, and the virtualization control program corresponds to an LPAR management program.

Figure 3:
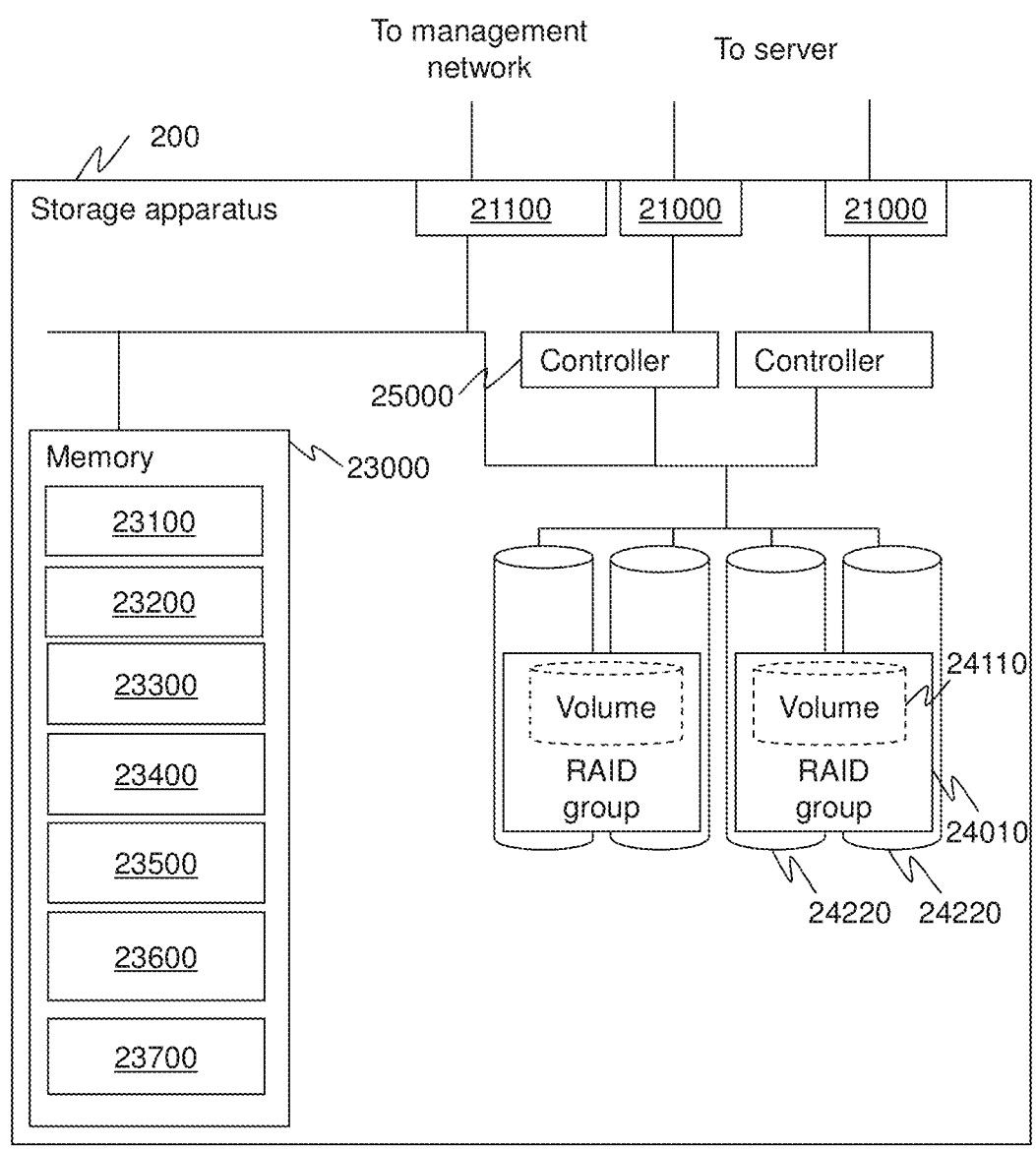
FIG. 3 illustrates a configuration example of a storage device.

FIG. 3 illustrates a configuration example of the storage device 200.

The storage device 200 is an example of a storage system, and includes a plurality of storage ports 21000, a management port 21100, a memory 23000, a RAID (Redundant Arrays of Inexpensive (or Independent) Disks) group 24010, and a controller 25000. These elements are coupled via a circuit such as an internal bus such that bidirectional communication is possible.

The storage ports 21000 may be coupled to the server 100 via the PCIe bus 46.

The management port 21100 may be coupled to the management server 300 via the management network 45.

In the memory 23000, programs and management information may be stored. The memory 23000 may be configured by one or more memories, and may include a storage device such as an auxiliary storage device.

In the RAID group 24010, various kinds of data may be stored.

The controller 25000 may control data and management information in the memory.

In the memory 23000, a disk management program 23100, a port management table 23200, a host group management table 23300, a RAID group management table 23400, a volume management table 23500, a host group-volume relation management table 23600, and a table size upper limit management table 23700 are stored.

The disk management program. 23100 communicates with the management server 300 via the management port 21100 to instruct the management server 300 to provide the storage device 200 with information included in at least one of the port management table 23200, the host group management table 23300, the RAID group management table 23400, the volume management table 23500, the host group-volume relation management table 23600, and the table size upper limit management table 23700.

The RAID group 24010 is configured by a plurality of non-volatile storage devices 24220. Instead of the RAID group 24010, a single non-volatile storage device 24220 may be employed. Logical VOLs 24110 are provided on the basis of one or more non-volatile storage devices 24220 such as the RAID group 24010. At least one logical VOL 24110 may be a virtual logical VOL such as a virtual volume according to Thin Provisioning.

The controller 25000 may include a processor configured to perform control in the storage device 200 and a cache memory configured to temporarily store data exchanged between the controller 25000 and the server 100. Each controller 25000 may be interposed between the storage port 21000 and the RAID group 24010 to control transfer of data therebetween.

The storage device 200 may have a configuration other than the configuration in FIG. 3 and the above-mentioned configuration as long as the storage device 200 includes a storage controller configured to receive an access request (referring to I/O request) that designates a logical VOL 24110 provided to the server 100 and read and write data from and to the logical VOL 24110 (for example, a storage device which is basis for logical VOL 24110), and the above-mentioned storage device configured to provide a storage area. For example, a storage controller and a storage device configured to provide a storage area may be stored in different casing. For example, the memory 23000 and the controller 25000 may be storage controllers. As expressions including both the case where the storage controller and the storage device exist in the same casing and the case where the storage controller and the storage device exist in different casings, the storage device may be translated as "storage system". The storage system may be a plurality of storage devices.

Figure 4:
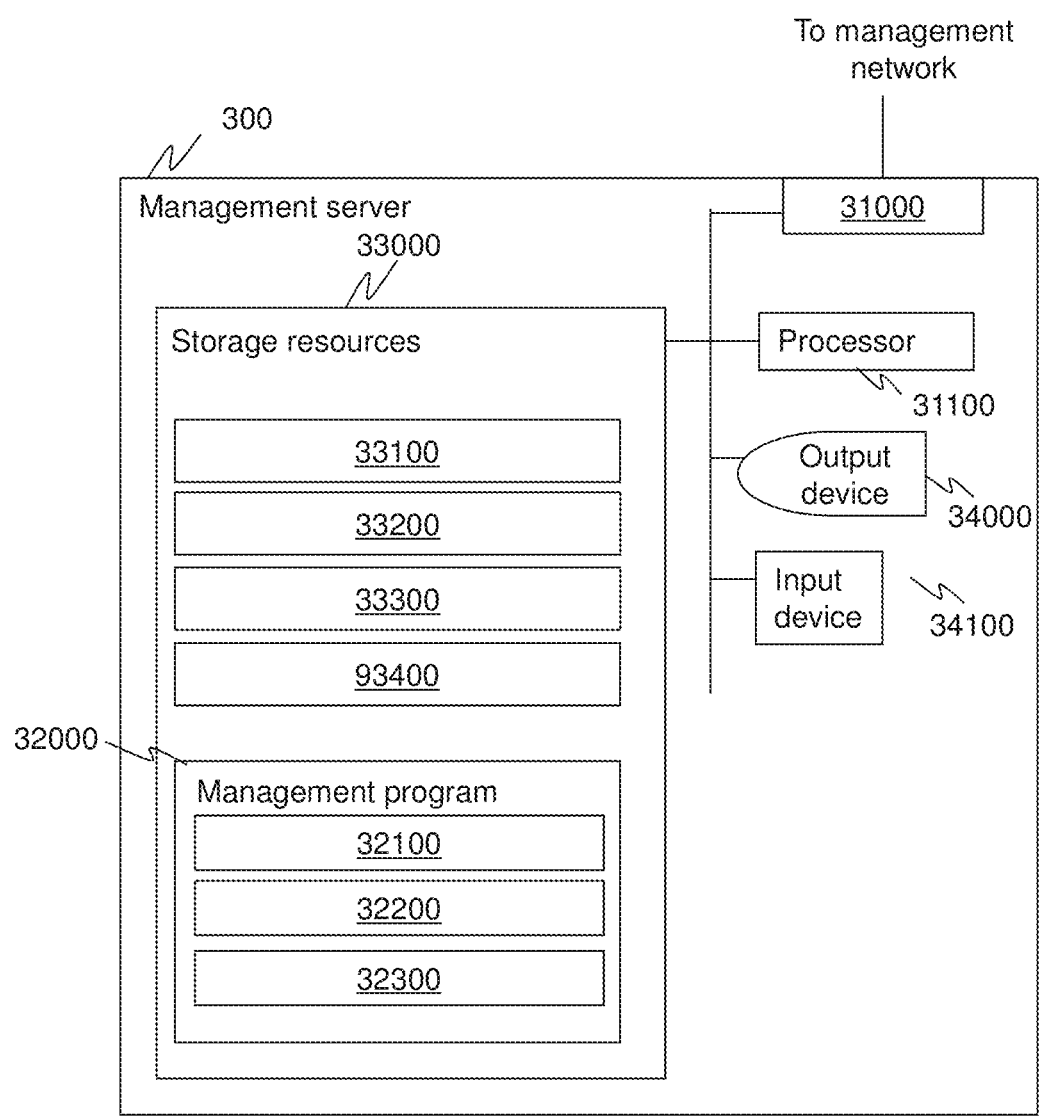
FIG. 4 illustrates a configuration example of a management server.

FIG. 4 illustrates a configuration example of the management server 300.

The management server 300 is an example of a management system, and may include a management port 31000 used for connection to the management network 45, a processor 31100, a storage resource 33000, an output device 31200 such as a display apparatus for outputting processing results described later, and an input device 31300 such as a keyboard used for an administrator to input instructions. These elements are coupled via a circuit such as an internal bus such that bidirectional communication is possible. The storage resource 33000 may be one or more memories (for example, semiconductor memories), or a non-volatile storage device may be mixed.

In the storage resource 33000, the management program 32000 is stored. The management program 32000 may include an apparatus management module 32100, an apparatus communication module 32200, and a GUI display processing module 32300. Each of the modules is provided as a program module for the storage resource 33000, but may be provided as a hardware module. The management program 32000 is not necessarily required to be configured by a module as long as processing in each module can be implemented. In other words, the following description of each module may be replaced with the description of the management program 32000.

In the storage resource 33000, an apparatus management table 33200, a host-storage path management table 33300, and a configuration table 93400 may be further stored. In the configuration table 93400, configuration information may be stored. For example, the configuration information may include each item in the I/O port management table 13300 collected by the apparatus communication module 32200 from each server 100 to be managed, each item in the LPAR management table 13400, each item in the LPAR operation schedule management table 13500, each item in the port management table 23200 collected from each storage to be managed, each item in the host group management table 23300, each item in the RAID group management table 23400, each item in the volume management table 23500, each item in the host group-volume relation management table 23600, and each item in the table size upper limit management table 23700. In the configuration table 93400, all tables in an apparatus to be managed and all items in the table are not necessarily required to be stored. The data expression format and the data structure of each item stored in the configuration table 93400 are not necessarily required to be the same as those in the apparatus to be managed. When the management program 32000 receives each item from the apparatus to be managed, the management program 32000 may receive each item in the data structure and the data expression format in the apparatus to be managed.

The apparatus communication module 32200 regularly or repeatedly access a management target apparatus under control to acquire configuration information on each component in the management target apparatus. The execution instruction is not necessarily required to be repeated for every strict constant period, and may be repeated at any timing. The apparatus communication module 32200 may instruct a management target apparatus under control to change its configuration in response to a request from the administrator. After instructing the management target apparatus to change its configuration, the apparatus communication module 32200 may acquire configuration information in each component in the management target apparatus again, and maintain the configuration information stored in the configuration table 93400 to the latest state.

In response to a request from the administrator via the input device 31300, the GUI display processing module 32300 displays the acquired configuration management information via the output device 31200. The input device and the output device may be separate devices, or may be one or more aggregated device.

The management server (management computer) may include, for example, a display, a keyboard, and a pointer device as input/output devices, and may have another apparatus. A serial interface or an Ethernet interface may be used as an alternative to the input/output device, and a display computer (for example, management client 35000) having a display, a keyboard, and/or a pointer device may be coupled to the interface. The management server may transmit display information to a display computer via the interface, receive input information from the display computer and display the input information on the display computer, and receive inputs, thereby substituting for the input and display by the input/output device.

Herein, an aggregate of one or more computers configured to manage a computer system (information processing system) and display display information can be referred to as "management system". A management computer configured to display display information on a display device or a remote display computer can be referred to as "management system", and a combination of the management computer and the display computer (for example, management client 35000 in FIG. 1) can also be referred to as "management system". In order to increase the processing speed and enhance the reliability, a plurality of computers may be used to implement processing similar to that in the management computer, and in this case, the plurality of computers (may include display computer) can be referred to as "management system".

FIG. 5 illustrates a reference example of the Boot Order.

The Boot Order is a table for managing the priority order of Device Paths used by the server. The Boot Order may be configured by a Description that is described by a user in any expression and a Device Path indicating the location of a device to be booted. The description of the Device Path is regulated by the specifications of UEFI, and may be generated by the EFI or the EFI driver. The Boot Order may be referred to as "boot order information". Each entry in the Boot Order may be referred to as "Boot Option".

FIG. 5 is an example in which the Device Path in the Boot Order is configured by WWN allocated to Fibre Channel as a key.

FIG. 6 illustrates an example of a Boot Order 1800 according to this embodiment.

The Device Path in the Boot Order 1800 according to this embodiment is configured by, in place of the WWN allocated to the Fibre Channel as illustrated in FIG. 5, a GUID indicating an arbitrary number allocated by a vendor and an LUID allocated to an LU (for example, logical VOL).

In this embodiment, "VenMsg(Vender GUID,LUID # C)" in FIG. 6 is expressed as "LUID # C". In this embodiment, "HD (1,MBR, 0xA06A915F, 0x800, 0xAF000)" in the Device Path in FIG. 6 is expressed as "LUN # z".

The Device Path is used for the EFI driver 170 to search for a device, and may have different descriptions among the EFI drivers 170.

The Boot Order 1800 in FIG. 6 indicates that the priority is high in the order of "FC1", "FC2", and "FC3". A system that has referred to the Boot Order in FIG. 6 repeats the operation of attempting to start from the Device Path having "FC1" in the entry "1", and when the starting has failed, next attempting to start from the Device Path having "FC2" in the entry "2".

The Boot Orders in FIG. 5 and FIG. 6 are both descriptions satisfying the specifications of UEFI, and typically, the expression in FIG. 5 is used in many cases. In this embodiment, however, the expression in FIG. 6 is used.

FIG. 7 and FIG. 8 illustrate configuration examples of a Boot Priority 1500 in the FC-HBA 120.

The Boot Priority 1500 may have, as item values, a WWN of an I/O port of a storage device, an LUN of the storage device, and an LUID allocated to a logical VOL in the storage device. The LUID is an ID unique to a plurality of logical VOLs existing in a plurality of storage devicees. For example, in FIG. 9, even when an active server and a standby server are allocated with logical VOLs in different storage devices, the LUIDs of the logical VOLs do not overlap with each other.

The Boot Priority 1500 may be referred to as "boot search information". The item values in the Boot Priority 1500 may be set by a user. An interface for setting and changing the item values in the Boot Priority 1500 may be provided by the EFI driver 170. The Boot Priority 1500 is used for the EFI driver 170 to reply the priority order in response to a device search instruction received from the EFI 190.

Typically, the LUID represents the value of Identification Descriptor in which Identifier Type is Name Address Authority or Identifier Type is T10 Vendor Identification among information in an Identification Description list that is obtained when the EFI driver 170 issues an Inquiry command requesting Device Identification VPD Page to the storage device and replies the same.

Figure 9:
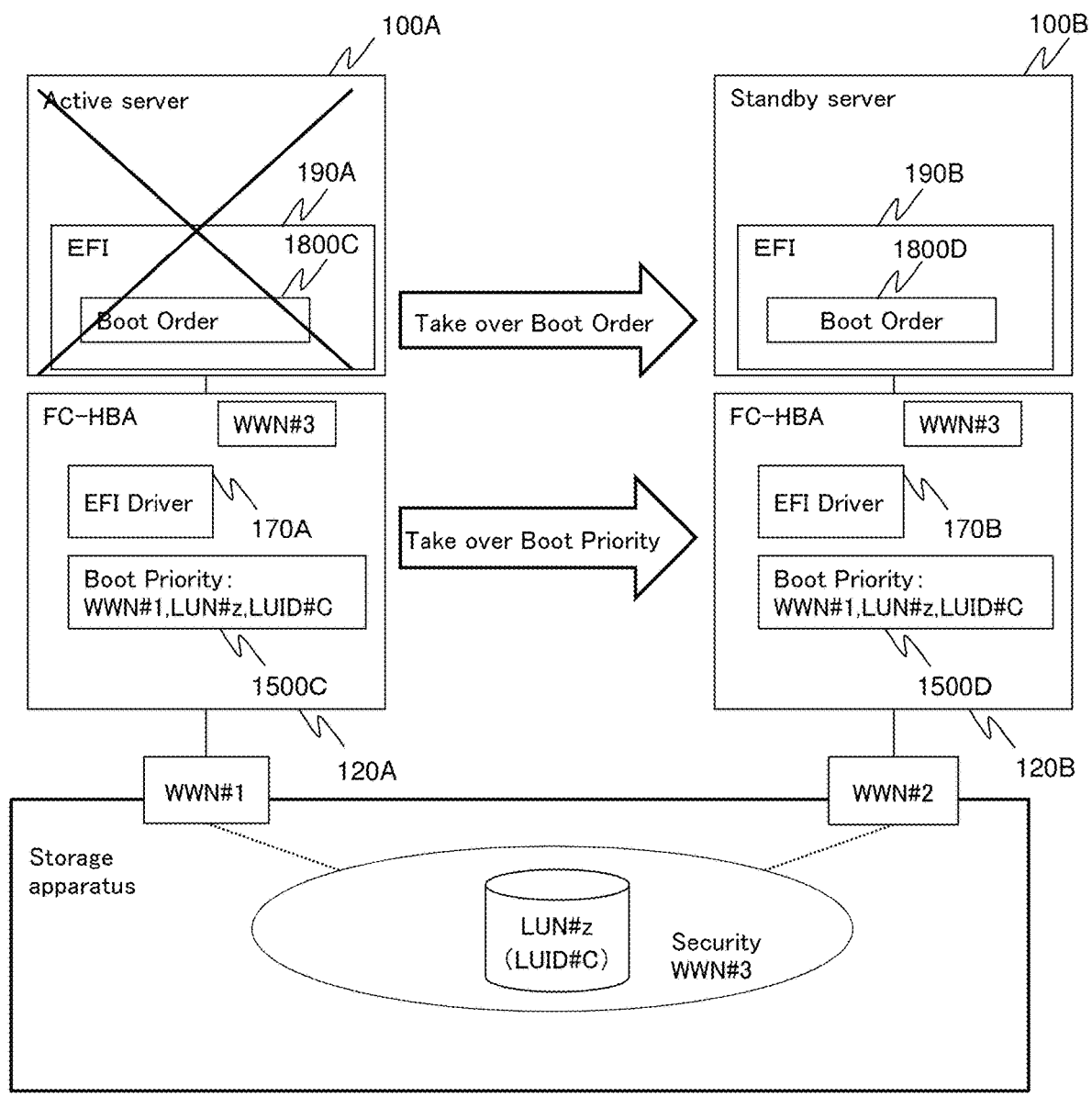
FIG. 9 illustrates an example of operation for implementing failover from an active server to a standby server.

FIG. 9 illustrates an example of operation for switching from an active server to a standby server when a failure has occurred in a redundant system.

When a failure has occurred in an active server 100A, the SVP copies a Boot Order 1800C in an EFI 190 in the active server 100 to an EFI 190B in a standby server 100B as failover processing (copied Boot Order is referred to as "Boot Order 1800D"). The SVP also copies a Boot Priority 1500C in an active FC-HBA 120A to a standby FC-HBA 120B (copied Boot Priority is referred to as "Boot Priority 1500D").

Figure 10:
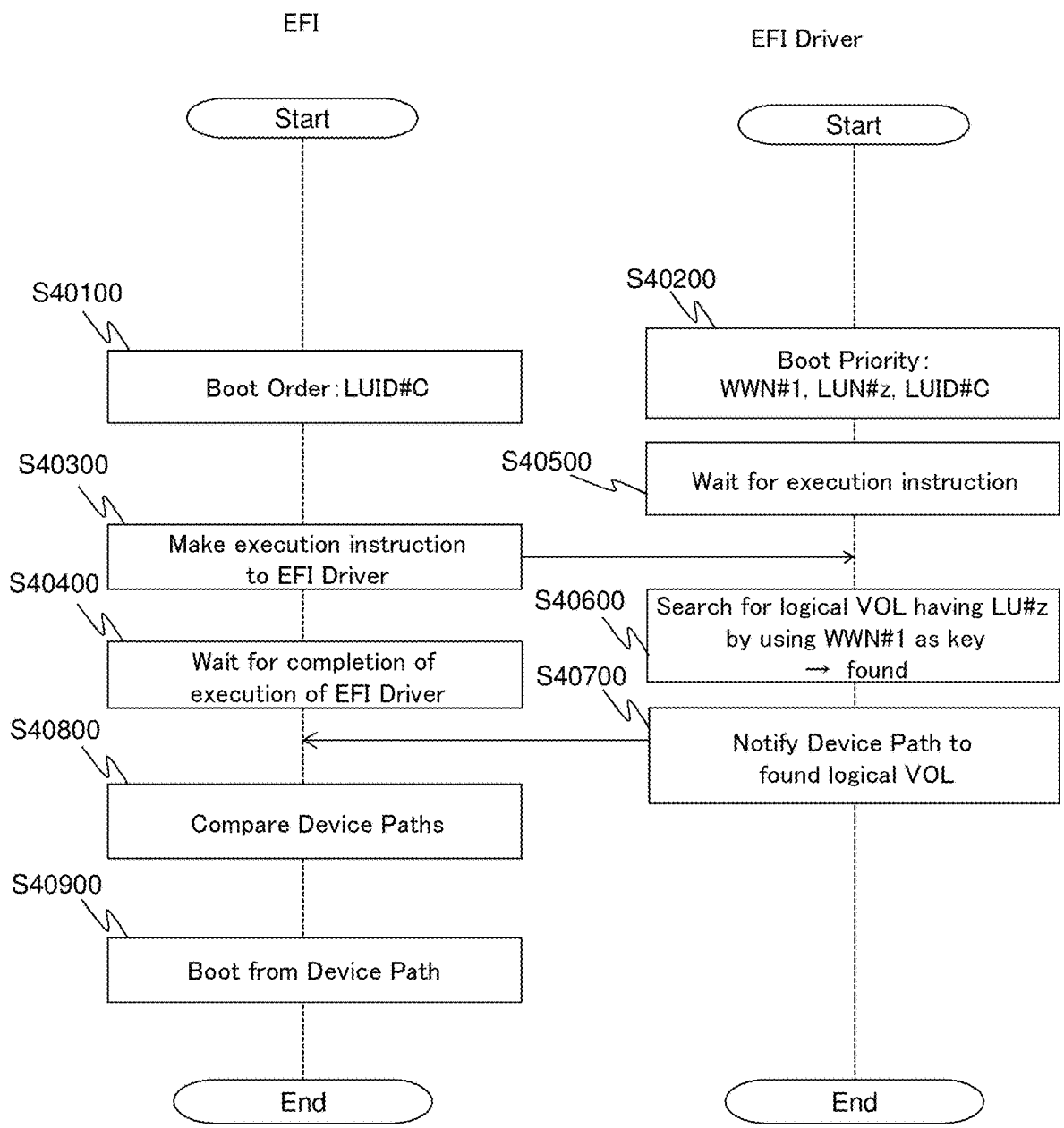
FIG. 10 is a sequence chart illustrating a boot operation example of the active server.
Figure 11:
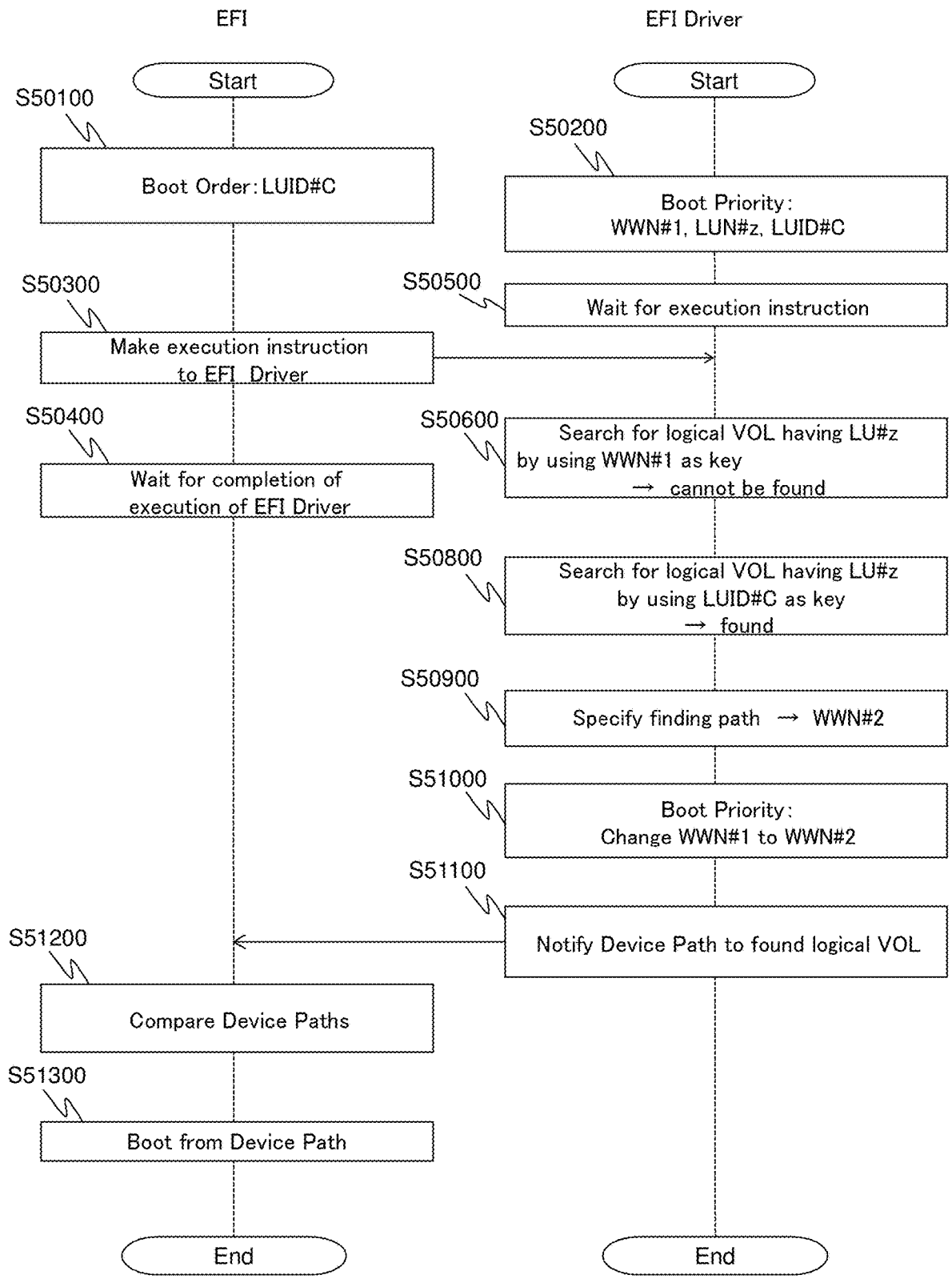
FIG. 11 is a sequence chart illustrating a boot operation example of the standby server after failover.

Next, FIG. 10 illustrates a boot operation example of the active server 100A, and FIG. 11 illustrates an example of boot operation of a standby server 100C after failover.

FIG. 10 is a sequence chart illustrating a boot operation example of the active server 100A in FIG. 9.

It is assumed that a Device Path including LUID # C is set in an entry "1" in the Boot Order 1800C in the active server 100A. It is assumed that WWN #1, LUN # z, and LUID # C are set in an entry "1" in the Boot Priority 1500C in the EFI driver 170A.

When power is input to the active server 100A, the EFI 190A and the EFI driver 170A start in cooperation.

The EFI 190A first reads the Device Path in the entry "1" of the Boot Order 1800C (S40100), and makes an execution instruction to the EFI driver 170A (S40300). The execution instruction may include LUID # C described in the read Device Path. The EFI 190A waits for the completion of execution of the EFI driver 170A (S40400).

On the other hand, the EFI driver 170A confirms that WWN #1, LUN # z, and LUID # C are set in the entry "1" of the Boot Priority 1500C (S40200), and waits until being invoked by the EFI 190A (S40500).

When receiving an execution instruction from the EFI 190A, the EFI driver 170A specifies, from the Boot Priority 1500C, WWN #1 and LUN # z corresponding to LUID # C included in the execution instruction. The EFI driver 170A uses the specified WWN #1 as a key to search for a logical VOL having LUN # z (S40600).

The FC-HBA 120A is coupled to WWN #1 in the storage device 200, and hence the EFI driver 170A can find the logical VOL having LUN # z by using WWN #1 as a key.

Thus, the EFI driver 170A transmits a Device Path described by using LUID # C of the found logical VOL to the EFI 190A (S40700).

The EFI 190A compares the Device Path transmitted from the EFI driver 170A with the Device Path for which the execution instruction has been performed in S40300 (S40800).

As a result of the comparison, any of the Device Paths matches in terms of the description for LUID # C, and hence the EFI 190A starts booting from the Device Path in the entry "1" (S40900).

FIG. 11 is a sequence chart illustrating a boot operation example of the standby server 100B after failover in FIG. 9.

When power is input to the standby server 100B, the EFI 190B and the EFI driver 170B start in cooperation.

The Boot Order 1800D in the EFI 190B is a copy of the Boot Order 1800C in the EFI 190A.

The Boot Priority 1500D in the FC-HBA 120B is a copy of the Boot Priority 1500C in the FC-HBA 120A.

The EFI 190B first reads a Device Path in an entry "1" in the Boot Order 1800D (S50100), and makes an execution instruction to the EFI driver 170B (S50300). The execution instruction may include LUID # C described in the Device Path. The EFI 190B waits for the completion of the execution of the EFI driver 170B (S50400).

On the other hand, the EFI driver 170B confirms that WWN #1, LUN # z, and LUID # C are set in the entry "1" in the Boot Priority 1500D (S50200), and waits until being invoked by the EFI 190B (S50500).

When receiving the execution instruction from the EFI 190B, the EFI driver 170B specifies, from the Boot Priority 1500D, WWN #1 and LUN # z corresponding to LUID # C included in the execution instruction. The EFI driver 170B searches for a logical VOL having the specified WWN #1 and LUN # z (S50600).

However, the FC-HBA 120B is coupled to WWN #2 in the storage device 200, and hence the EFI driver 170B cannot find the logical VOL having LUN # z by using the WWN #1 as a key (S50700).

Thus, the EFI driver 170B next searches for the logical VOL having LUN # z by using LUID # C as a key (S50800).

A logical VOL having LUID # C exists in the storage device 200 coupled to WWN #2, and hence the EFI driver 170B can find the logical VOL having LUN # z by using LUID # C as a key. The EFI driver 170B recognizes that a path to the logical VOL having LUN # z is WWN #2 (S50900).

Thus, the EFI driver 170B overwrites WWN #1 in the entry "1" in the Boot Priority 1500D to WWN #2 (S51000). Through the overwriting, similarly to FIG. 10, the logical VOL having LUN # z can be immediately found by using WWN #2 corresponding to LUID # C as a key from the next time.

The EFI driver 170B transmits a Device Path described by using LUID # C of the found logical VOL to the EFI 190B (S51100).

The EFI 190B compares the Device Path transmitted from the EFI driver 170B with the Device Path through which the execution instruction is performed in S40300 (S51200).

As a result of the comparison, any of the Device Paths coincides in terms of the description for LUID # C, and hence the EFI 190B starts booting from the Device Path in the entry "1" (S51300).

Figure 12:
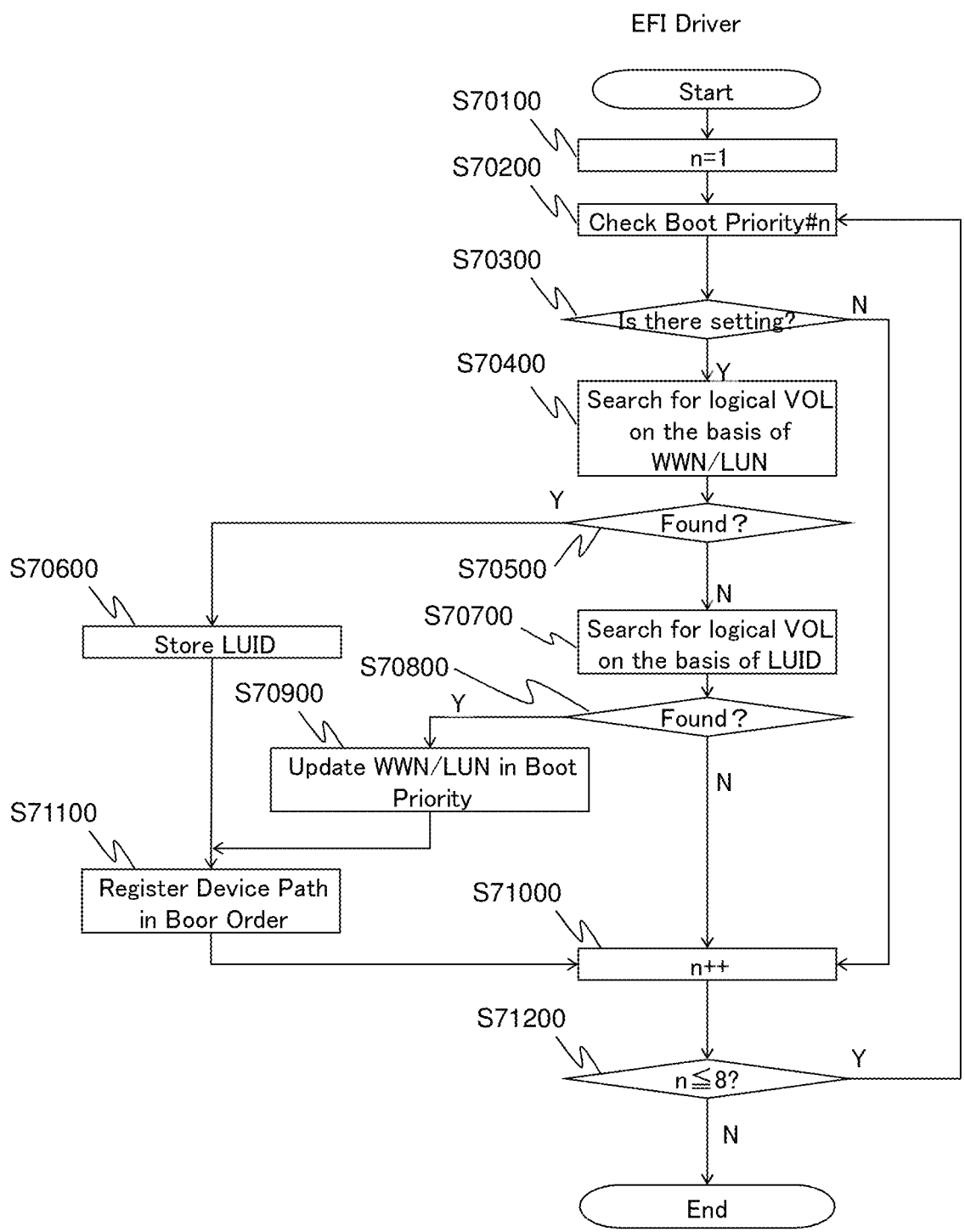
FIG. 12 is a flowchart illustrating a processing example of an EFI driver according to this embodiment.

FIG. 12 is a flowchart illustrating a processing example of the EFI driver 170 according to this embodiment.

The EFI driver 170A in the active FC-HBA 120A may perform the processing in FIG. 12 in S40600 in FIG. 10, and the EFI driver 170B in the standby FC-HBA 120B may perform the processing in FIG. 12 in S50600, S50700, S50800, and S50900 in FIG. 11.

The EFI driver 170 initializes a variable n (n is an integer) for managing the maximum entry number (for example, "8") in the Boot Priority 1500 to "1" (S70100).

The EFI driver 170 checks the n-th entry in the Boot Priority 1500 (S70200).

When the n-th entry has no settings (S70300: NO), the EFI driver 170 increments n by 1 (S71000), and proceeds to S71200.

When the n-th entry has settings (S70300: YES), the EFI driver 170 searches for a logical VOL of which WWN and LUN match with a WWN and an LUN set in the n-th entry (S70400). Then, the EFI driver 170 proceeds to S70500.

In the search in S70400, when the logical VOL of which WWN and LUN match with the WWN and the LUN set in the n-th entry is found (S70500: YES), the EFI driver 170 stores an LUID of the found logical VOL in the n-th entry (S70600).

The EFI driver 170 stores a Device Path described by using the LUID of the found logical VOL in the Boot Order 1800 (S71100). The EFI driver 170 increments the variable n by 1 (S71000), and proceeds to S71200.

In the search in S70400, when the logical VOL of which WWN and LUN match with the WWN and the LUN set in the n-th entry is not found (S70500: NO), the EFI driver 170 searches for a logical VOL of which LUID matches with an LUID set in the n-th entry (S70700). The EFI driver 170 proceeds to S70800.

In the search in S70700, when the logical VOL of which LUID matches with the LUID set in the n-th entry is found (S70800: YES), the EFI driver 170 overwrites a WWN and an LUN in the found logical VOL in the n-th entry (S70900).

The EFI driver 170 stores a Device Path described by using the LUID of the found logical VOL in the Boot Order 1800 (S71100). The EFI driver 170 increments the variable n by 1 (S71000), and proceeds to S71200.

In the search in S70700, the logical VOL of which LUID matches with the LUID set in the n-th entry is not found (S70800: NO), the EFI driver 170 increments the variable n by 1 (S71000), and proceeds to S71200.

In S71200, when n is larger than 8 (n<8: NO), the EFI driver 170 finishes the search for the logical VOL, and when n is equal to or smaller than 8 (n<8: YES), the EFI driver 170 returns to S70200 to continue the search for the logical VOL.

S40600 in FIG. 10 corresponds to, in the processing in FIG. 12, the processing performed when a logical VOL of which WWN and LUN match with the WWN and the LUN set in the n-th entry is found in S70500.

S50600, S50700, S50800, and S50900 in FIG. 11 correspond to, in the processing in FIG. 12, the processing performed when a logical volume of which WWN and LUN match with the WWN and the LUN set in the n-th entry is not found in S70500 and a logical VOL of which LUID matches with the LUID set in the n-th entry is found in S70800.

According to this embodiment, as illustrated in the examples in FIG. 11 and FIG. 12, even when failover is performed from the active server 100A to the standby server 100B, the standby server 100B can be started normally. If the Boot Order is described as in the example in FIG. 5, the standby server cannot find a logical VOL in S50700 and fails to start.

The reason why a WWN is first used as a key to search for a logical VOL, and when the logical VOL is not found in the search, an LUID is used as a key to search for the logical VOL in FIG. 10 to FIG. 12 is that the logical VOL can be searched for at a higher speed by using the WWN as a key than by using the LUID as a key (that is, boot time is shortened). Thus, in this embodiment, as illustrated in FIG. 7 and FIG. 8, when a logical VOL is found by using an LUID as a key, a WWN in the Boot Priority 1500 is updated to a WWN on a path to the found logical VOL, thereby shortening the next boot time.

While some embodiments have been described above, the embodiments are illustrative of this invention and the scope of this invention is not intended to be limited to only the embodiments. This invention can be implemented in various other forms.

REFERENCE SIGNS LIST

1 Integrated platform
100 Server
120 FC-HBA
200 Storage device
190 EFI
170 EFI driver
1500 Boot Priority
1800 Boot Order

The invention claimed is:

1. An integrated platform, comprising:
an active server having a respective processor and a respective memory;
a standby server having a respective processor and a respective memory; and
a storage device,
wherein:
the storage device has a plurality of storage ports, and the plurality of storage ports are each assigned with a respective World Wide Name (WWN);
a plurality of logical volumes are provided by the storage device, and the plurality of logical volumes are each assigned with a respective Logical Unit ID (LUID) that identifies the logical volume;
the active and standby servers are each coupled to the storage ports of the storage device in a one-to-one relationship;
the active server stores boot search information that associates the respective WWN of one of the storage ports of the storage device to which the active server is coupled, a respective Logical Unit Number (LUN) of a boot logical volume, which is one of the logical volumes accessed during booting, and the respective LUID of the boot logical volume with one another; and
when failover is executed, the boot search information of the active server is copied to the standby server.

2. The integrated platform according to claim 1, wherein the active and standby servers each include a respective Extensible Firmware Interface (EFI) and a respective EFI driver;
the EFI of the active server stores boot order information that conforms to a Unified Extensible Firmware Interface (UEFI) specification and includes first device path information on a first device path to the boot logical volume, and the first device path information includes the respective LUID of the boot logical volume;
the EFI driver of the active server stores the boot search information; and
when failover is executed, the boot search information in the EFI of the active server is copied to the EFI of the standby server, and the boot order information in the EFI driver of the active server is copied to the EFI driver of the standby server.

3. The integrated platform according to claim 2, wherein the EFI of the standby server is configured to issue the respective LUID included in the boot order information to the EFI driver of the standby server; and
the EFI driver of the standby server is configured to:
search the boot search information for the boot logical volume by using the respective WWN associated with the respective LUID issued from the EFI of the standby server; and
when the boot logical volume is not found as a result of the search using the respective WWN associated with the respective LUID, search the boot search information for the boot logical volume by using the respective LUID issued from the EFI of the standby server.

4. The integrated platform according to claim 3, wherein the EFI driver of the standby server is configured to:
when the boot logical volume is found as a result of the search for the boot logical volume using the respective LUID issued from the EFI of the standby server, change the respective WWN associated with the respective LUID in the boot search information to a WWN of the one of the storage ports on another device path through which the boot logical volume is found.

5. The integrated platform according to claim 4, wherein the EFI driver of the standby server is configured to:
when the boot logical volume is found, return second device path information of the other device path using the respective LUID of the boot logical volume to the EFI device of the standby server; and
the EFI of the standby server is configured to:
when the first device path information including the respective LUID issued to the EFI driver of the standby server matches with the second device path information including the respective LUID returned from the EFI driver of the standby server, start booting from the boot logical volume indicated by the second device path information.

6. A server coupled to a storage device, wherein
the storage device has a plurality of storage ports, and the plurality of storage ports are each assigned with a respective World Wide Name (WWN),
a plurality of logical volumes are provided by the storage device, and the plurality of logical volumes are each assigned with a respective Logical Unit ID (LUID) that identifies the logical volume,
the server comprising:
a processor;
a memory; and
a Fibre Channel-Host Bus Adapter (FC-HBA) coupled to one of the storage ports of the storage device in a one-to-one relationship,
wherein:
the processor is programmed to store boot search information that associates the respective WWN of the one of the storage ports to which the active server is coupled, a respective Logical Unit Number (LUN) of a boot logical volume, which is one of the logical volumes accessed during booting, and the respective LUID of the boot logical volume with one another; and
when failover is executed, the boot search information in the server is copied to another server.

7. The server according to claim 6, further comprising:
an Extensible Firmware Interface (EFI) and an EFI driver, wherein:
the EFI stores boot order information that conforms to a Unified Extensible Firmware Interface (UEFI) specification and includes first device path information on a first device path to the boot logical volume, and the first device path information includes the respective LUID of the boot logical volume,
the EFI driver is included in the HC-FBA and stores the boot search information, and
when failover is executed, the boot search information in the EFI in the server is copied to another EFI in the other server, and the boot order information in the EFI driver in the server is copied to another EFI driver in the other server.

8. A method of failover between an active server and a standby server coupled to a storage device,
the storage device having a plurality of storage ports, the plurality of storage ports each being assigned with a respective World Wide Name (WWN),
a plurality of logical volumes are provided by the storage device, and the plurality of logical volumes are each assigned with a respective Logical Unit ID (LUID) that identifies the logical volume,
the active and standby servers are each coupled to the storage ports of the storage device in a one-to-one relationship,
the active server stores boot search information that associates the respective WWN of one of the storage ports of the storage device to which the active server is coupled, a respective Logical Unit Number (LUN) of a boot logical volume, which is one of the logical volumes accessed during booting, and the respective LUID of the boot logical volume with one another,
the failover method comprising copying, when failover from the active server to the standby server is executed, the boot search information in the active server to the standby server.

9. The failover method according to claim 8, wherein
the active and standby servers each include a respective Extensible Firmware Interface (EFI) and a respective EFI driver;
the EFI of the active server stores boot order information that conforms to a Unified Extensible Firmware Interface (UEFI) specification and includes first device path information on a first device path to the boot logical volume, and the first device path information includes the respective LUID of the boot logical volume;
the EFI driver of the active server stores the boot search information,
when the failover from the active server to the standby server is executed, the boot search information in the EFI in the active server is copied to the EFI in the standby server, and the boot order information in the EFI driver in the active server is copied to the EFI driver in the standby server.

\* \* \* \* \*